US012468260B2

(12) United States Patent
Tortora et al.

(10) Patent No.: US 12,468,260 B2
(45) Date of Patent: Nov. 11, 2025

(54) METHOD FOR MANUFACTURING LUMINESCENT HANDS

(71) Applicant: The Swatch Group Research and Development Ltd, Marin (CH)

(72) Inventors: Pierpasquale Tortora, Neuchâtel (CH); Cédric Blatter, Commugny (CH); Cyrille Gernez, Boudry (CH)

(73) Assignee: The Swatch Group Research and Development Ltd, Marin (CH)

( * ) Notice: Subject to any disclaimer, the term of this patent is extended or adjusted under 35 U.S.C. 154(b) by 318 days.

(21) Appl. No.: 18/037,612

(22) PCT Filed: Sep. 2, 2021

(86) PCT No.: PCT/EP2021/074292
§ 371 (c)(1),
(2) Date: May 18, 2023

(87) PCT Pub. No.: WO2022/122199
PCT Pub. Date: Jun. 16, 2022

(65) Prior Publication Data

US 2023/0418226 A1 Dec. 28, 2023

(30) Foreign Application Priority Data

Dec. 11, 2020 (EP) .................................... 20213515

(51) Int. Cl.
*G04B 19/04* (2006.01)
*G04B 19/32* (2006.01)

(52) U.S. Cl.
CPC ........... *G04B 19/042* (2013.01); *G04B 19/32* (2013.01)

(58) Field of Classification Search
CPC .. G04B 19/042; G04B 19/32; G04B 45/0007; G04B 19/12; G04B 19/30; G04B 19/305; G04G 9/0041; G02B 6/0083
See application file for complete search history.

(56) References Cited

U.S. PATENT DOCUMENTS

| | | | | |
|---|---|---|---|---|
| 6,208,591 B1 * | 3/2001 | Sakurazawa | G04B 19/30 313/110 |
| 6,266,297 B1 * | 7/2001 | Sonoda | G04B 19/12 368/227 |
| 7,366,059 B2 * | 4/2008 | Seyr | G04B 19/32 368/79 |

FOREIGN PATENT DOCUMENTS

| | | |
|---|---|---|
| EP | 950 166 A1 | 12/2015 |
| EP | 502 792 A1 | 6/2019 |
| GB | 421 809 A | 7/2006 |

OTHER PUBLICATIONS

International Search Report for PCT/EP2021/074292 dated Nov. 25, 2021.

* cited by examiner

*Primary Examiner* — Edwin A. Leon
(74) *Attorney, Agent, or Firm* — Sughrue Mion, PLLC

(57) ABSTRACT

A method for manufacturing a luminescent hand for a horological movement, preferably for a watch. The method includes providing a support comprising a light guide and structuring an emergent surface of the light guide so as to extract a maximum amount of light from the luminescent hand. The luminescent hand includes, over a lower face, a layer of luminescent material including one or more deposit(s) of fluorescent material, opposite a light source. The light source is laced at locations close to the axis of rotation or away from the axis of rotation but at a distance from the luminescent material. Thus, the light source is not placed on the luminescent hand.

7 Claims, 2 Drawing Sheets

METHOD FOR MANUFACTURING LUMINESCENT HANDS

CROSS REFERENCE TO RELATED APPLICATIONS

This application is a National Stage of International Application No. PCT/EP2021/074292 filed Sep. 2, 2021, claiming priority based on European Patent Application No. 20213515.8 filed Dec. 11, 2020.

TECHNICAL FIELD

The present invention relates to the field of luminescent hands and more particularly to the manufacture of luminescent hands.

TECHNOLOGICAL BACKGROUND

There are several methods for making hands for horological movements.

Nonetheless, these methods are not suitable for the manufacture of luminescent hands because too often it turns out that the hands return only a small amount of light or concentrate a large part of the light at one point, which is not necessarily the effect pursued by the Applicant.

Indeed, some manufacturing methods lead to the light being extracted only in one plane of the hand or reflected inwards, and therefore, it results in a low luminosity of the hand.

SUMMARY OF THE INVENTION

The present invention aims to solve all or part of the aforementioned drawbacks thanks to a method for manufacturing at least one luminescent hand for a horological movement, preferably for a watch; said manufacturing method comprising at least one:

- Providing at least one support; said at least one support comprising at least one light guide; said at least one light guide comprising at least one emergent surface and being configured to guide light; and,
- Structuring said at least one emergent surface.

Thanks to this arrangement, it is possible to manufacture a luminescent hand for a horological movement with a light distribution.

According to one embodiment, said at least one structuring is carried out by abrasion, by ablation, by sandblasting, by stamping and/or photo-structuring.

Thanks to this arrangement, it is possible to distribute the light by increasing said at least one emergent surface.

According to one embodiment, said at least one provision of at least one support comprises a deposition of at least one layer of a first optical material; said at least one layer of a first optical material comprising a first refractive index.

According to one embodiment, said deposition of said at least one layer of a first optical material comprises a heat treatment step.

Thanks to either one of these previous arrangements, it is possible to manufacture a luminescent hand with a reflective layer.

According to one embodiment, said at least one provision of at least one support comprises at least one deposition of at least one layer of luminescent material.

Thanks to this arrangement, it is possible to manufacture a luminescent hand.

According to one embodiment, said at least one provision of at least one support comprises a deposition of at least one layer of a second optical material; said at least one layer of a second optical material comprising a second refractive index.

According to one embodiment, said first refractive index is lower than said second refractive index.

Thanks to this arrangement, it is possible to refract the light towards said at least one emergent surface.

The present invention aims to solve all or part of the aforementioned drawbacks by means of at least one luminescent hand comprising at least one:

- Support; said at least one support being configured to form a hand; and
- Light guide; said at least one light guide comprising at least one emergent surface configured to be rough so as to extract light from said at least one light guide.

Thanks to this arrangement, it is possible to have at least one luminescent hand able to extract a maximum of light from said at least one emergent surface.

According to one embodiment, said at least one light guide comprises at least one layer of a first optical material comprising a first refractive index and at least one layer of a second optical material comprising a second refractive index; said first refractive index is lower than said second refractive index.

Thanks to this arrangement, it is possible to guide the light towards said at least one emergent surface.

BRIEF DESCRIPTION OF THE FIGURES

The invention will be described in more detail hereafter using the accompanying drawings, given by way of examples that are in no way limiting, wherein.

DETAILED DESCRIPTION OF THE INVENTION

There are several types of luminescent hands on the market. Nonetheless, the Applicant proposes a new generation of luminescent hands.

Figure 8:
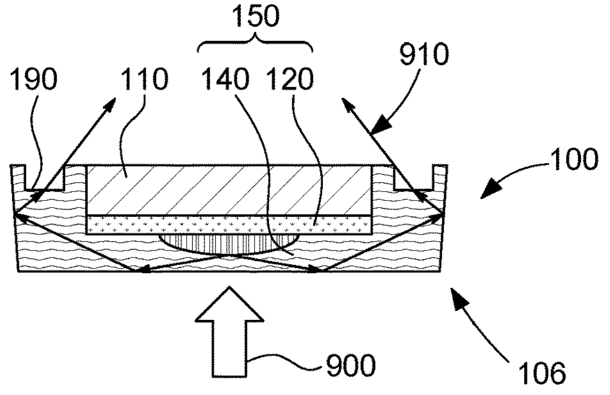

Indeed, the Applicant proposes at least one luminescent hand 100, observable in FIG. 8, comprising at least one support 110 configured to form a hand and at least one light guide 150 comprising at least one emergent surface 190 configured to be rough so as to extract light 910 from said at least one light guide 150.

Figure 1:
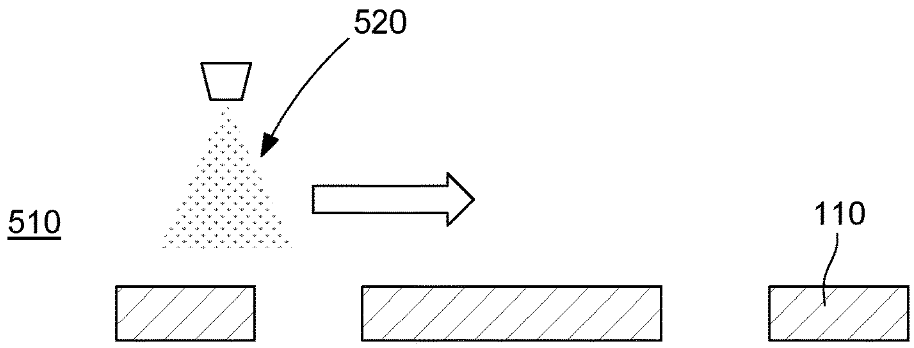
FIG. 1 shows a deposition 520 of at least one layer of a first optical material 120 after provision 510 of at least one support 110 according to one embodiment.

Said at least one luminescent hand 100, intended to be used in a horological movement, preferably for a watch, may be obtained thanks to the manufacturing method 500 of the Applicant. For this purpose, said manufacturing method comprises at least one provision 510 of at least one support 110, preferably a sheet metal 110, as illustrated in FIG. 1.

Said at least one support 110 receives, during a deposition 520, at least one layer of a first optical material 120, preferably at least one optical insulation layer allowing preventing light from being absorbed by said sheet metal 110, comprising a first refractive index followed by a heat treatment 525 at a determined temperature 521. Before said deposition 520 of said at least one layer of a first optical material 120, said sheet metal 110 or said at least one support 110 may be washed or washed and then a plasma treatment may be applied to promote the adhesion of said at least one layer of a first optical material 120. In this case, said at least one layer of a first optical material 120 may be a resin commercialised by the company POLYRISE™ for example, and is intended to optically isolate the surface of said at least one support 110 so that it could absorb as little light as possible. This optical isolation can be permitted thanks to said first refractive index which cannot be greater than 1.60, in particular 1.45 and preferably 1.35.

Said at least one layer of a first optical material 120 may be deposited for example by printing or by spraying, since spraying allows selectively depositing said at least one layer of a first optical material 120 over the useful portions and avoiding wastages.

Figure 2:
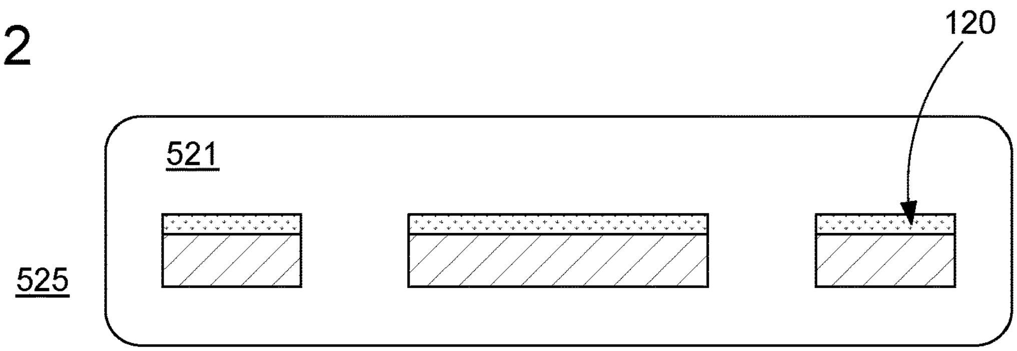
FIG. 2 illustrates a heat treatment step 525 according to one embodiment.

As mentioned before, said at least one layer of a first optical material 120 undergoes said heat treatment 525 for example for one hour at 300° C. under dinitrogen, so that the solvent of said at least one layer of a first optical material 120 could evaporate, which could be observed in FIG. 2.

Figure 3:
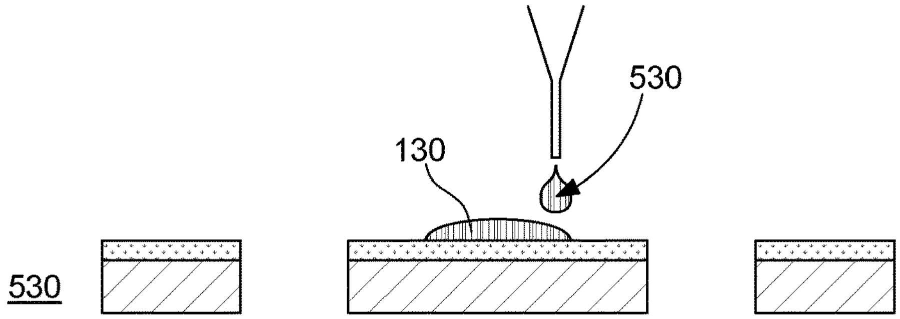
FIG. 3 shows the deposition 530 of at least one layer of luminescent material 130 according to one embodiment.

As illustrated in FIG. 3, at least one deposition 530 of at least one layer of luminescent material 130 may be carried out on said at least one support 110, preferably over said at least one layer of a first optical material 120. Said at least one layer of luminescent material 130, preferably comprising fluorescent pigments and an adhesive enabling attachment by polymerisation, is intended to illuminate said at least one luminescent hand 100 when said at least one layer of luminescent material 130 is illuminated by a light source having a wavelength range less than 530 nm for example.

Indeed, the fluorescent pigments may be a source of a secondary fluorescent light. In watches, the fluorescent pigments can be excited remotely by a source of blue or ultraviolet light for example. It should be noted that other techniques such as screen-printing or digital printing could be used for said at least one deposition 530 of said at least one layer of luminescent material 130.

Figure 4:
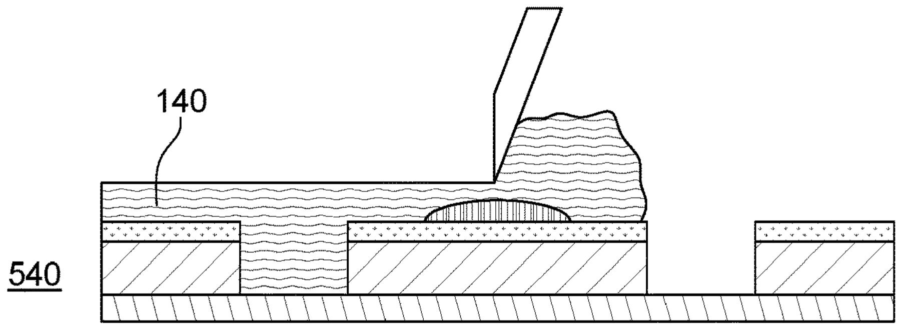
FIGS. 4 and 5 show the deposition 540 and the formation 550 of at least one layer of a second optical material 140 according to one embodiment.

A UV plasma treatment lasting a few minutes follows in order to promote the adhesion of at least one layer of a second optical material 140, of the ORMOCLEAR®10 resin type from MICRORESIST TECHNOLOGY™ for example, which takes place by rod coating or doctor blade type deposition 540, which could be translated as spread coating as represented in FIG. 4 for example.

Still with reference to FIG. 4, one could observe that said at least one layer of a second optical material 140 can be pushed by a blade so as to fill the different cavities that might exist.

It should be noted that said at least one layer of a second optical material 140 comprises a second refractive index greater than said first refractive index so as to guide the fluorescent light emitted by said at least one layer of luminescent material 130.

Figure 5:
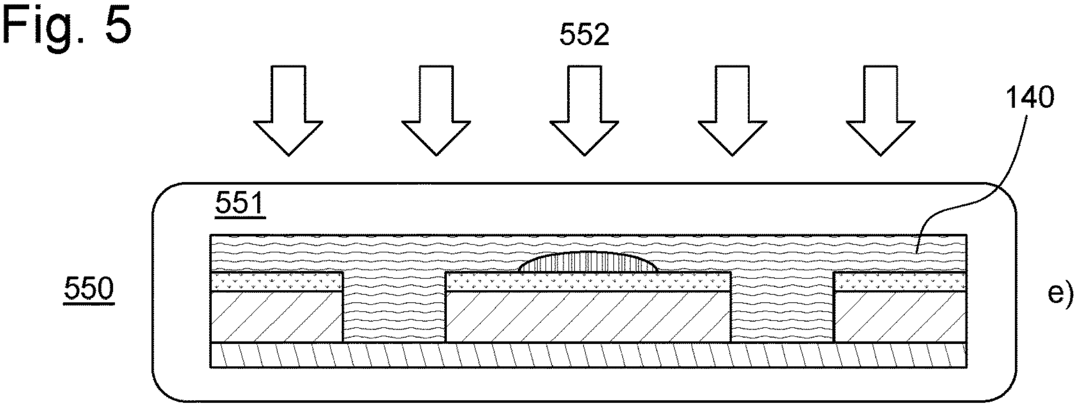

Visible in FIG. 5, said at least one layer of a second optical material 140 may be fixed by exposure under ultraviolet light 552 and under vacuum 551. Alternatively, it may be possible to laminate a plastic film in order to expel air before insolation under ultraviolet light.

Indeed, the lower face of said at least one layer of a second optical material 140 comprises one or more deposit (s) of fluorescent material, opposite a light source 900, so as to establish optical contact with said at least one layer of luminescent material 130, and as mentioned before, at least one layer of luminescent material 130 may be formed of fluorescent pigments incorporated in a glue. Alternatively, the fluorescent material may be embedded in the light guide layer.

In operation, the light source 900 illuminates said at least one layer of luminescent material 130 having a wavelength shorter than the wavelength that will be emitted again by said at least one layer of luminescent material 130. Said at least one layer of luminescent material 130 absorbs this incident light and emits it again 910, in particular in said at least one layer of a second optical material 140. The presence of said at least one layer of a first optical material 120 enables a total internal reflection of the fluorescent light propagating in said at least one layer of a second optical material 140 and thus avoids a progressive absorption in said at least one support 110.

The difference in refractive index between said at least one support 110 and said at least one layer of a second optical material 140 is comprised within the interval ranging from 0.5 to 0.9, preferably from 0.55 to 0.8, more preferably from 0.6 to 0.75, allows increasing the value of the critical angle and therefore the numerical aperture of said at least one layer of a second optical material 140 in order to maximise the coupling of the fluorescent light. It should be noted that the presence of said at least one layer of a first optical material 120 enables the transmission without loss in said at least one layer of a second optical material 140 once the light has been coupled and that the index of said at least one layer of a first optical material 120 influences the amount of coupled light. Said at least one layer of a first optical material 120 may have a thickness comprised within the interval ranging from 2 μm to 15 μm, preferably from 3 μm to 12 μm, still more preferably from 5 μm to 10 μm. A multitude of total internal reflections in said at least one layer of a second optical material 140 follow until reaching one end of said at least one luminescent hand 100 where the light flux is transmitted outwards.

Figure 6:
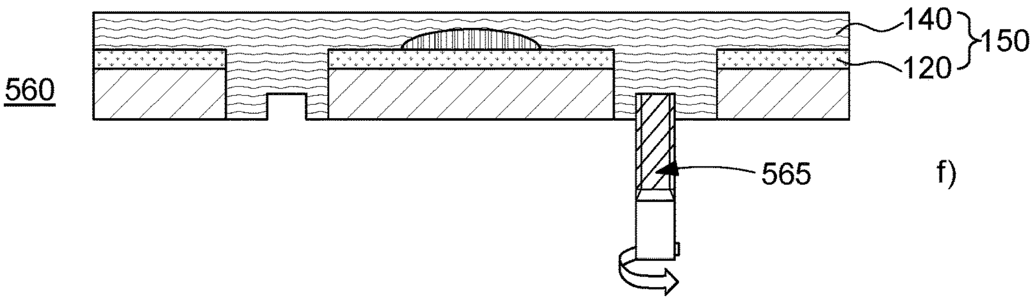
FIG. 6 represents a step 560 of structuring said at least one emergent surface 190 according to one embodiment.

Finally, a step 560 of structuring said at least one emergent surface 190, schematised in FIG. 6, may be carried out by abrasion 565, by ablation 565, by sandblasting 565, by stamping 565 and/or photo-structuring 565 in order to increase said at least one emergent surface 190 and/or totally or partially avoiding light 910 being refracted again which would lead to a concentration of a large part of the light at one point for example. Indeed, a surface structuring may be provided for, i.e. the material of said at least one layer of a second optical material 140 may be peeled locally so as to induce a roughness, over said at least one emergent surface 190 of said at least one layer of a second optical material 140 so that extraction of the light 910 is facilitated therefrom.

In addition, a light diffusion area, which can be made by deposition of a resin, may be added to said at least one luminescent hand 100, extending beyond, i.e. projecting from said at least one support 110 to facilitate the leakage of the luminous flux and to obtain a decorative pattern on said tip. According to embodiments that are not represented, not only the tip of said at least one luminescent hand 100 but also the edges of said at least one luminescent hand 100 and possibly the head comprise said at least one emergent surface 190.

Figure 7:
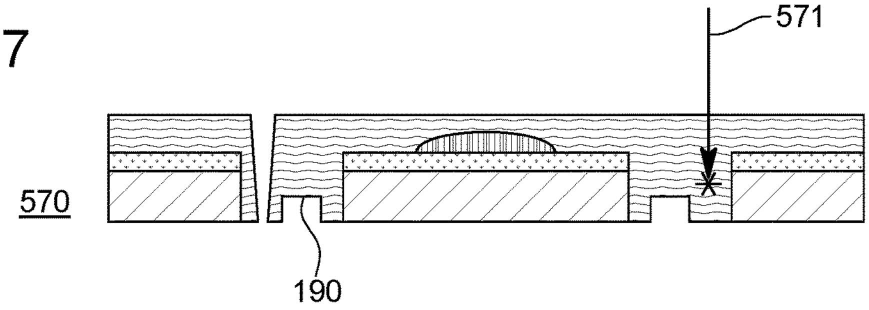
FIG. 7 shows the cut-out 570 of at least one luminescent hand 100; and, FIG. 8 illustrates said at least one luminescent hand 100 in operation according to one embodiment.

A step 570 of cutting said at least one luminescent hand 100 is carried out for example by laser 571, preferably, because the laser 571 can melt said at least one light guide 150, composed of said at least one layer of a first optical material 120 and at least one layer of a second optical material 140, and produce a polished surface condition, FIG. 7, which allows reflecting a light 910 towards the inside of said at least one light guide 150.

In the example of FIG. 8, said at least one emergent surface 190 corresponds to a peripheral surface of said at least one luminescent hand 100 in order to illuminate the profile of said at least one luminescent hand 100. Indeed, when said at least one layer of luminescent material 130 is subjected to said light source 900 having a wavelength comprised between 330 nm and 560 nm, said at least one layer of luminescent material 130 generates said light 910 which is extracted via said at least one emergent surface 190 of said at least one light guide 150. Of course, it is also possible to place the light sources LEDs at appropriate locations for the considered product, like for example close to the axis of rotation or away from the axis of rotation and to add an optical coupler allowing bringing the luminous flux of said light source 900 to the appropriate place to excite the fluorescent material of said at least one luminescent hand 100. Thus, unlike the prior art, said light source 900 is not placed on said at least one luminescent hand 100.

The invention claimed is:

1. A method for manufacturing at least one luminescent hand for a horological movement, the manufacturing method comprising:

providing at least one support supporting the luminescent hand; and forming on the at least one support a light guide comprising at least one emergent surface and being configured to guide a light, the forming step including the following sub-steps:

depositing on said support at least one layer of a first optical material comprising a first refractive index and allowing preventing the light from being absorbed by the support;

depositing at least one layer of luminescent material over the at least one layer of the first optical material;

depositing of at least one layer of a second optical material, said at least one layer of a second optical material comprising a second refractive index; and, structuring said at least one emergent surface so that this emergent surface is rough so as to extract the light from said at least one light guide.

2. The manufacturing method according to claim 1, wherein said at least one structuring is carried out by abrasion, by ablation, by sandblasting, by stamping and/or photo-structuring.

3. The manufacturing method according to claim 1, wherein said deposition of said at least one layer of a first optical material comprises a heat treatment step.

4. The manufacturing method according to claim 1, wherein said at least one deposition of at least one layer of luminescent material comprises fluorescent pigments.

5. The manufacturing method according to claim 1, wherein said first refractive index is lower than said second refractive index.

6. A luminescent hand for a horological movement comprising:

a support supporting the hand; and a light guide, said at least one light guide comprising at least:

a layer of a first optical material comprising a first refractive index and allowing preventing light from being absorbed by the support;

a layer of luminescent material over the at least one layer of the first optical material;

a layer of a second optical material comprising a second refractive index; and an emergent surface configured to be rough so as to extract light from said at least one light guide.

7. The luminescent hand according to claim 6, wherein said first refractive index is lower than said second refractive index.

* * * * *